Nov. 13, 1934.   L. E. SPEAR   1,980,361
APPARATUS FOR FORMING, FILLING, AND CLOSING CONTAINERS
Filed Dec. 8, 1930   10 Sheets-Sheet 1

INVENTOR
LAMBERT E. SPEAR
BY
ATTORNEYS

Nov. 13, 1934.   L. E. SPEAR   1,980,361
APPARATUS FOR FORMING, FILLING, AND CLOSING CONTAINERS
Filed Dec. 8, 1930   10 Sheets-Sheet 2

INVENTOR
LAMBERT E. SPEAR
BY
ATTORNEYS

Nov. 13, 1934.  L. E. SPEAR  1,980,361
APPARATUS FOR FORMING, FILLING, AND CLOSING CONTAINERS
Filed Dec. 8, 1930  10 Sheets-Sheet 4

INVENTOR
LAMBERT E. SPEAR
BY
ATTORNEYS

Nov. 13, 1934.                L. E. SPEAR                  1,980,361
           APPARATUS FOR FORMING, FILLING, AND CLOSING CONTAINERS
                    Filed Dec. 8, 1930         10 Sheets-Sheet 5

INVENTOR
LAMBERT E. SPEAR
BY
ATTORNEYS

Nov. 13, 1934.  L. E. SPEAR  1,980,361
APPARATUS FOR FORMING, FILLING, AND CLOSING CONTAINERS
Filed Dec. 8, 1930  10 Sheets-Sheet 6
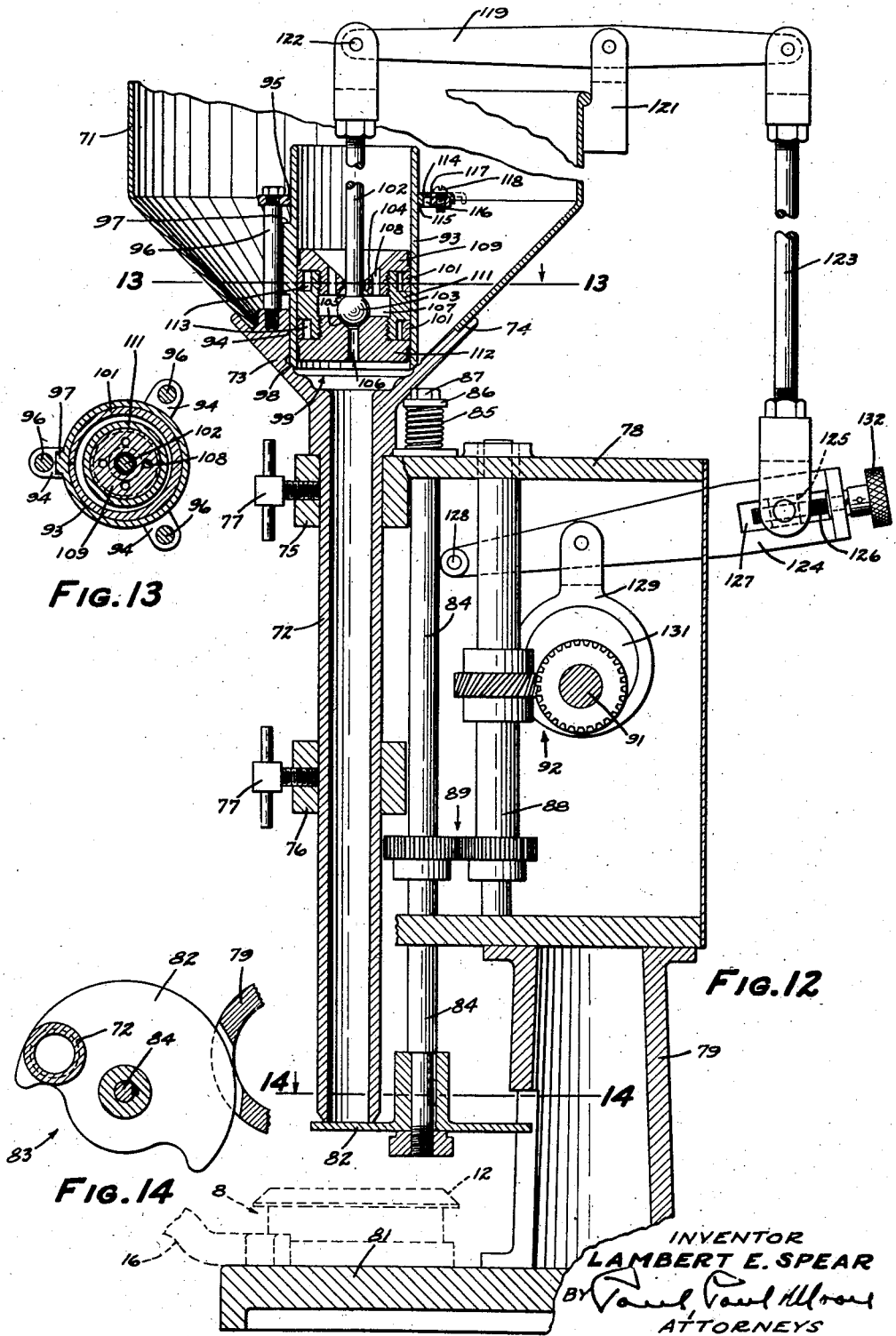

Nov. 13, 1934.  L. E. SPEAR  1,980,361
APPARATUS FOR FORMING, FILLING, AND CLOSING CONTAINERS
Filed Dec. 8, 1930  10 Sheets-Sheet 7
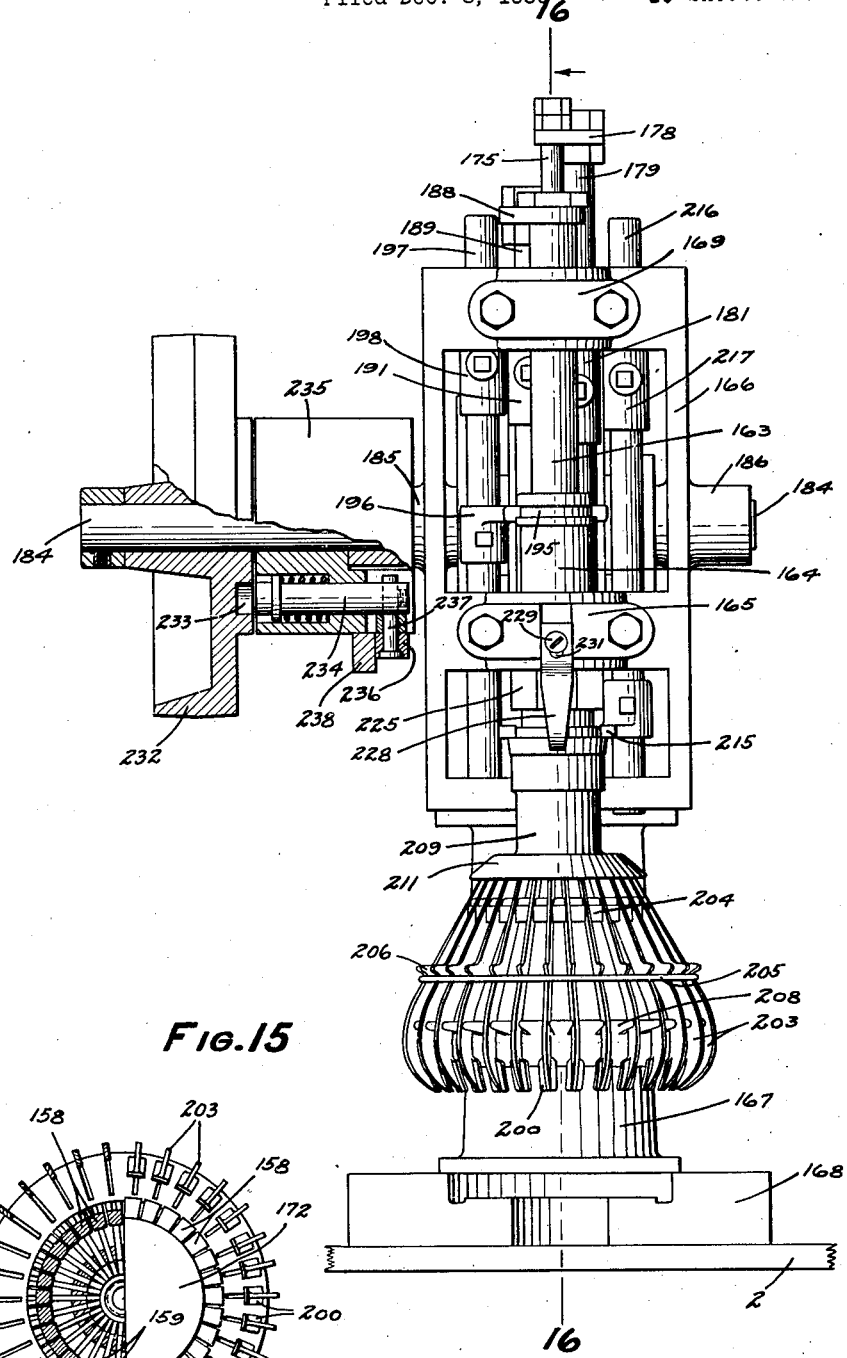
FIG.15
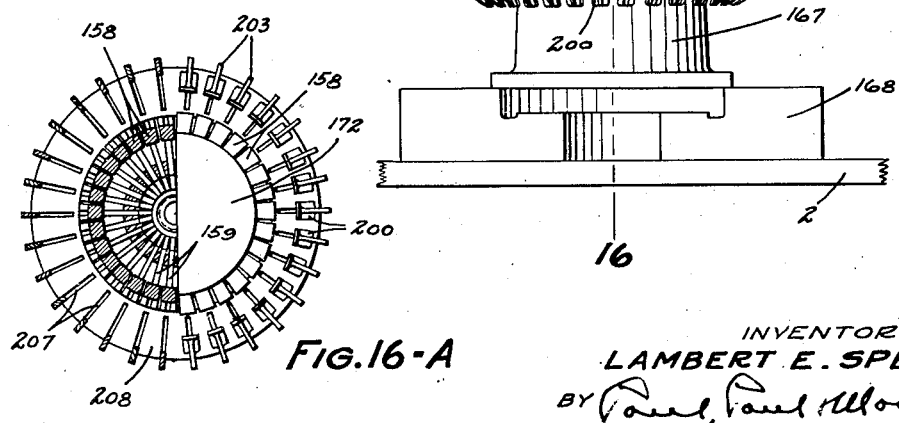
FIG.16-A
INVENTOR
LAMBERT E. SPEAR
BY
ATTORNEYS

INVENTOR
LAMBERT E. SPEAR
BY
ATTORNEYS

Nov. 13, 1934. L. E. SPEAR 1,980,361
APPARATUS FOR FORMING, FILLING, AND CLOSING CONTAINERS
Filed Dec. 8, 1930 10 Sheets-Sheet 9

INVENTOR
LAMBERT E. SPEAR
BY
ATTORNEYS

Nov. 13, 1934.  L. E. SPEAR  1,980,361
APPARATUS FOR FORMING, FILLING, AND CLOSING CONTAINERS
Filed Dec. 8, 1930  10 Sheets-Sheet 10

INVENTOR
LAMBERT E. SPEAR
BY
ATTORNEYS

Patented Nov. 13, 1934

1,980,361

UNITED STATES PATENT OFFICE 1,980,361

APPARATUS FOR FORMING, FILLING, AND CLOSING CONTAINERS

Lambert E. Spear, Minneapolis, Minn., assignor to Blue Moon Cheese Products, Inc., Minneapolis, Minn., a corporation of Delaware Application December 8, 1930, Serial No. 500,823

14 Claims. (Cl. 93—6)

This invention relates to new and useful improvements in apparatus for forming, filling and closing containers.

An object of the invention is to provide an apparatus including a plurality of stations; one of said stations comprising mechanism adapted to form containers from sheet material; another station comprising means adapted to deliver a predetermined quantity of material into each container; and another station including mechanism adapted to secure a closure to each filled container in hermetically sealed relation.

A further object is to provide an apparatus for forming, filling, and closing containers, including a mechanism comprising a holder adapted to support a sheet of material; a plunger adapted to be moved into engagement with said sheet of material whereby the outer marginal edge portions thereof are folded upwardly to form the side walls of the container; and means being provided for crimping or forming a plurality of small folds in the upturned portions of the sheet to take up the surplus material resulting from folding the material upwardly and inwardly; and means for applying pressure to said crimped wall portions to retain the walls in shape.

A further object is to provide a container-forming mechanism including a holder adapted to support a sheet of material from which the container is to be formed, and provided with a plurality of spaced-apart hinged members normally retained in horizontal position, and a plunger adapted to be moved into engagement with said material and force it downwardly through said holder whereby said hinged members will swing upwardly and fold the marginal edge portions of said sheet against the sides of the plunger, and means on the plunger for crimping or forming a plurality of small folds in the marginal portions of said sheet to take up the surplus material therein; and means also being provided in the plunger adapted to outwardly flare the upper marginal edge portions of the partially completed container walls to provide an annular flange adapted to provide a seat for a closure.

A further object is to provide a machine including a mechanism adapted to deliver a predetermined quantity of material into a container; said mechanism comprising a hopper provided with a feed tube and a cylindrical sleeve being mounted for relative movement in the hopper, and a piston movable in said sleeve and provided with means for preventing the formation of a vacuum in the feed tube thereby to prevent air pockets from forming in the material as it is delivered into the container.

A further object is to provide a mechanism for delivering a predetermined quantity of material into each container, said mechanism being provided with means whereby the quantity of material delivered into each container may be varied.

A further object is to provide an apparatus for forming, filling, and closing container, including a container closing and sealing mechanism comprising a plurality of forming elements adapted to cooperate with a plurality of pivoted fingers to fold the marginal edge portions of the container walls and also the marginal edge portions of the container closure inwardly and forming a series of folds therein, whereby the closure will be secured to the container in leak-proof relation.

A further object is to provide a mechanism for closing and sealing filled containers including a mold adapted to receive and support the filled container, and a plunger comprising a plurality of radially movable forming elements adapted to be moved into engagement with a closure seated upon the container, and to firmly press said closure into engagement with the upper marginal edge portion of the container; said plunger also comprising a plurality of pivoted fingers adapted to engage overhanging marginal edge portions of the container and closure walls and fold them inwardly, said forming elements and pivoted fingers being adapted to form a series of folds in the edge portions of the walls of the container and closure, after which pressure is applied to said folded edge portions to secure the closure to the container in leakproof relation.

A further object is to provide an apparatus particularly adapted for packaging such materials as, for example, cheese, after the latter has been heated to a temperature to thoroughly sterilize it, and render it semi-fluid or plastic; the material being delivered into the containers and the latter closed and hermetically sealed, while the material is thus heated, whereby the packaged material may be kept fresh for a long period of time in a warm or moderate temperature.

Other objects reside in the construction of the mold wherein the container is supported during the filling and sealing operation; in the means provided for relatively adjusting the bottom of the mold; in the means provided for returning the mold from station C to station A; and in the general construction of the machine which is such as to provide an apparatus which will operate efficiently and accurately, and which will require little attention upon the part of the operator.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 12 is an enlarged vertical sectional view on the line 12—12 of Figure 2, showing the measuring and filling mechanism;

Figure 12A is an enlarged detail sectional view showing the clutch for operating the container filling mechanism;

Figure 12B is a detail sectional view showing the cam lever for controlling the operation of the clutch shown in Figure 12A;

Figure 13 is a detail sectional view on the line 13—13 of Figure 12, with some of the parts omitted;

Figure 14 is a detail sectional view on the line 14—14 of Figure 12, showing the means for cutting off the flow of material to the container;

Figure 15 is a front elevation of the container closing and sealing mechanism, partially broken away to show the construction of the clutch mechanism;

Figure 16A is a sectional plan view on the line 16A—16A of Figure 16, showing the folding fingers and elements in expanded positions;

The novel machine featured in this invention includes three stations which hereinafter will be referred to as stations A, B, and C. Station A comprises the mechanism for forming the containers from sheets of a suitable material; station B the mechanism for filling the containers; and station C the mechanism for closing and sealing the filled containers.

Figure 1:
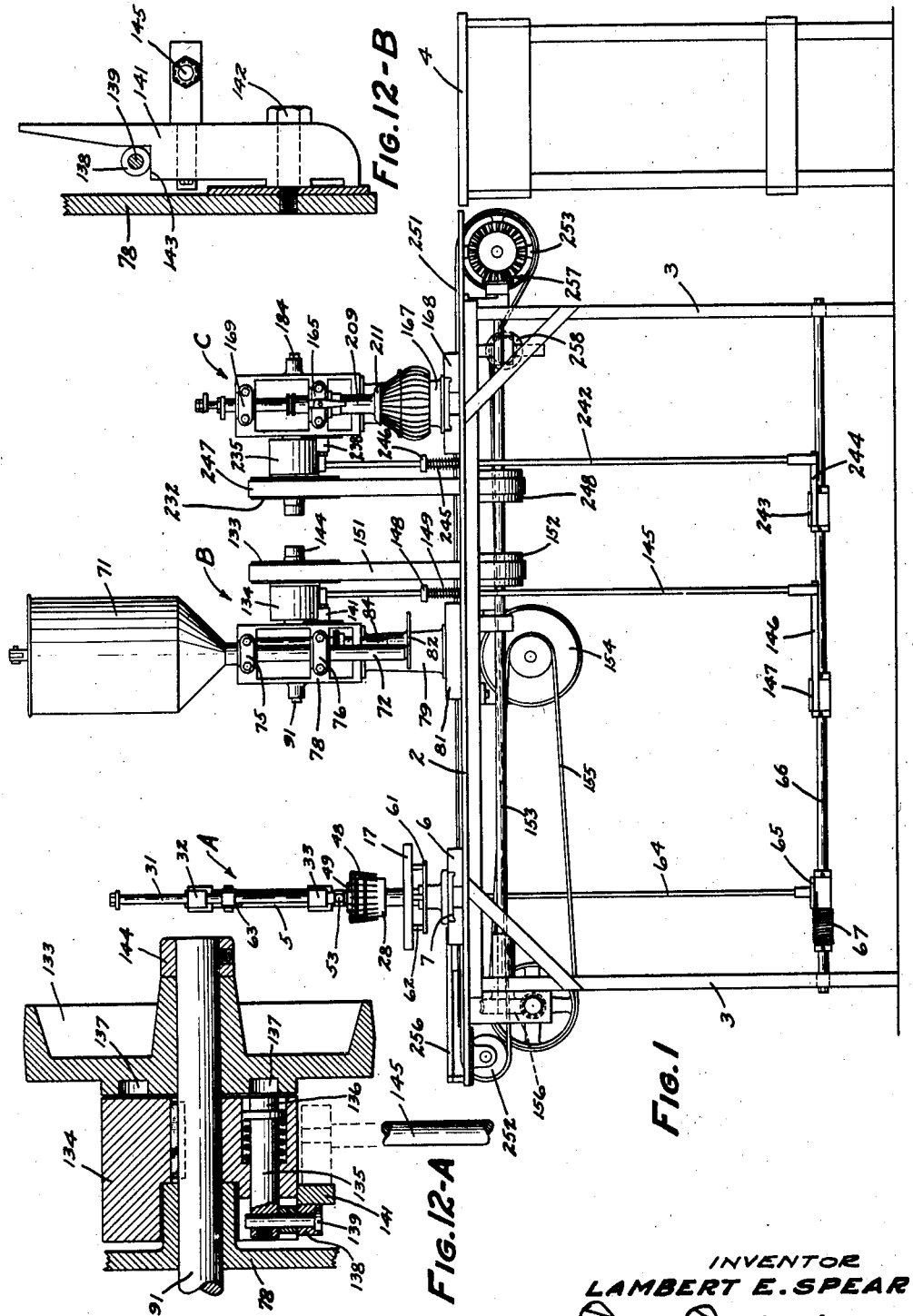
Figure 1 is a front elevation of my improved packaging machine.
Figure 2:
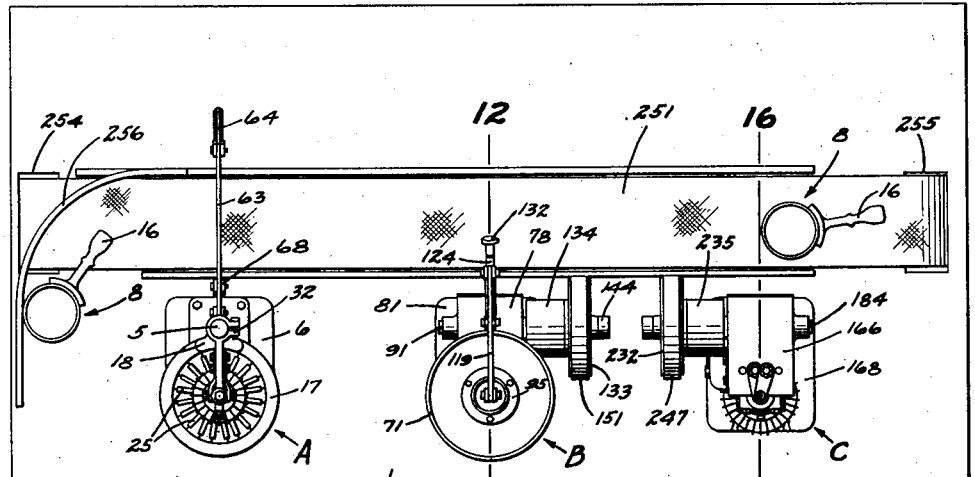
Figure 2 is a plan view of the machine.

As shown in Figures 1 and 2, the machine preferably comprises a table 2 supported upon suitable legs. An auxiliary table 4 may be provided at the discharge end of the machine for receiving the filled containers after they have been closed and sealed.

*Container forming mechanism—Station A*

Figure 11:
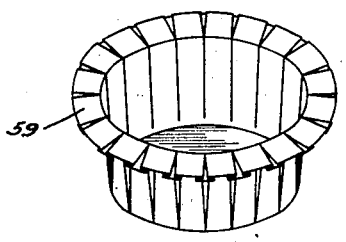
Figure 11 is a view showing a completely formed container.

The means provided for forming the containers from sheets of material is shown in Figures 3 to 9, inclusive, and comprises an upright 5 mounted upon a suitable base plate 6, suitably secured to the table 2. The base plate 6 is provided with a recessed seat 7 adapted to receive a mold 8, here shown as being circular in form and comprising a lower annular member 9 preferably integrally formed with the walls 11 of the mold, as shown in Figures 3 and 4, 6, 7, and 8. The upper edge of the wall 11 of the mold is provided with a downwardly inclined face 12 for purposes hereinafter described. In the accompanying drawings, I have shown the mold as being circular in form so as to produce a container shaped as shown in Figure 11. It is to be understood, however, that the parts constituting the container forming mechanism may be so designed as to form containers of various shapes as, for example, square, rectangular, or other desired shapes without departing from the scope of the invention.

Figure 9:
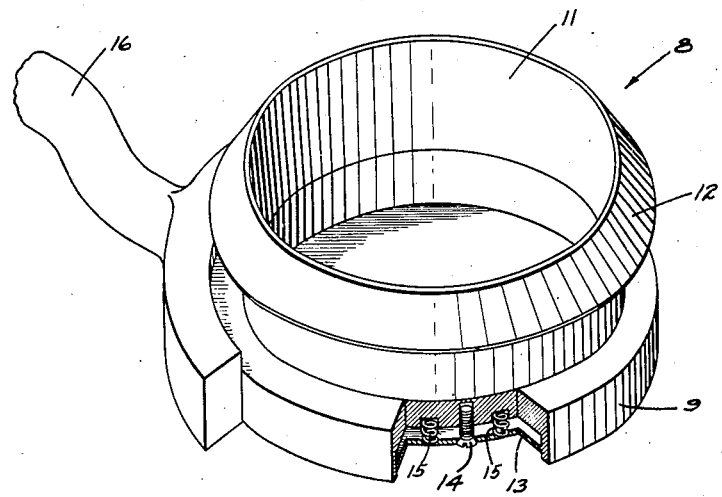
Figure 9 is a perspective view showing the mold and the means for relatively adjusting the bottom thereof.

The mold 8 is shown provided with a bottom 13 adjustably secured to the lower edges of the walls 11 thereof by such means as screws 14. Suitable compression springs 15 are preferably interposed between the bottom 13 and the lower edges of the walls 11 of the mold, as shown in Figure 9, whereby the bottom may be adjusted to slightly vary the capacity of the mold by simply relatively rotating the screws 14 in their sockets. The mold is provided with a suitable handle 16, whereby it may be conveniently moved from station to station during the operation of forming, filling, and closing the containers.

Figure 10:
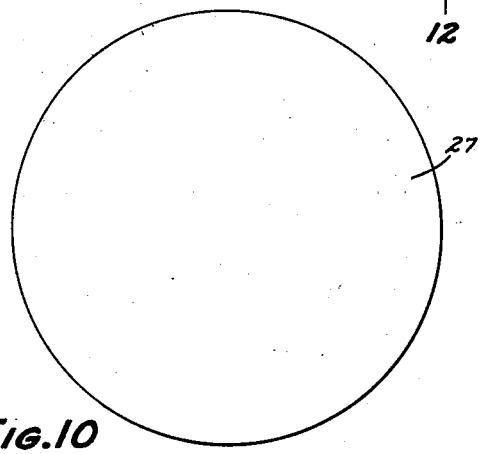
Figure 10 is a view showing a sheet of material from which a container such as shown in Figure 11 may be formed.
Figure 31:
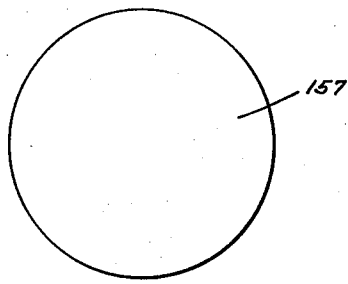
Figure 31 is a view showing a blank or disk adapted to form a closure for a container such as shown in Figure 11.
Figure 3:
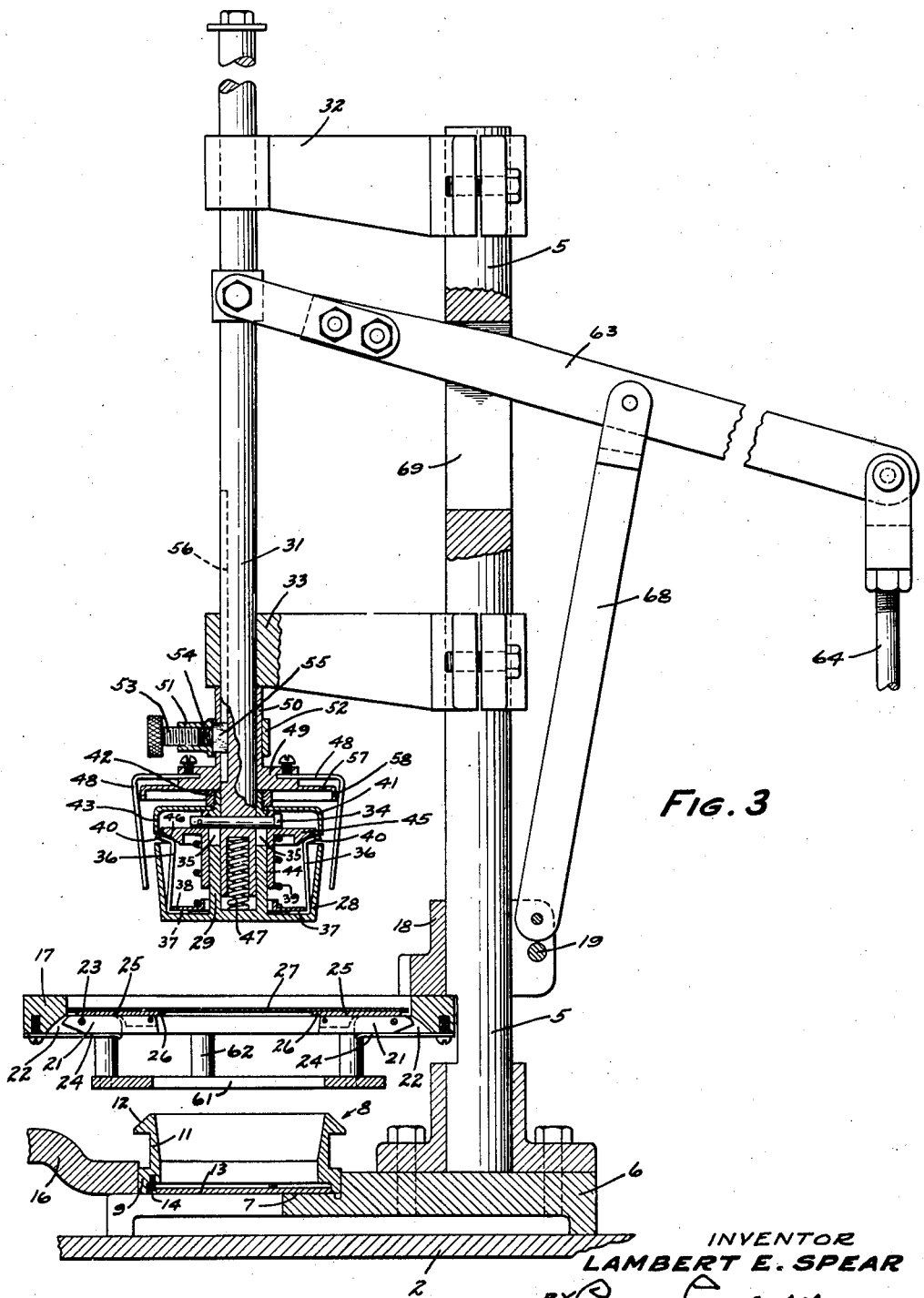
Figure 3 is an enlarged detail sectional view showing the container forming mechanism in inoperative position.

A suitable holder 17, in the present instance, circular in configuration, is supported upon the upright 5 by means of a bracket 18, preferably clamped thereto by a bolt 19, the hub of the bracket 18 being split as shown in Figure 3. The holder 17 is provided with a plurality of radially disposed members 21 adapted to be received in radial slots 22 provided in the holders 17 and pivotally mounted in said slots by means of a wire 23, best shown in Figure 5. Flat springs 24 retain the members 21 in their normal horizontal positions shown in Figures 3, 4, 7, and 8. Each hinged member 21 has a small folding plate 25 pivotally connected with the outer end thereof, the inner ends 26 of which overhang the inner ends of the members 21, as shown in Figure 3. The members 21 and plates 25 are adapted to support a sheet of material 27 from which the container is formed, as will subsequently be described. The plates 25, when in normal horizontal positions, lie beneath the upper surface of the holder 17, so as to produce an annular recess adapted to receive the sheet of material 27 which, in the present instance, is circular in formation, as shown in Figure 10.

A cup-shaped plunger 28 is movably supported above the holder 17 and has a central hub 29 bored to receive the lower end of a plunger rod 31 guidingly supported in brackets 32 and 33 suitably secured to the upright 5, as shown in Figure 3. The plunger 28 is adapted for relative axial movement upon the rod 31, such movement being limited by means of a pin 34 secured in the rod 31 and having its end portions received in elongated apertures 35 provided in the hub 29 of the plunger 28. A plurality of elements 36 are mounted within the plunger 28 and each is provided at its lower end with an off-set end portion 37 adapted to be seated against the bottom wall of the plunger. A plate 38 is situated on top of the off-set end portions 37 and is constantly urged downwardly thereagainst by the action of a suitable spring 39. The opposite end portions 40 of the elements 36 are normally positioned within the confines of the plunger 28, as shown in Figure 3.

A plate 41 is suitably secured to the upper end of the hub 29 of the plunger 28 by means of a ring nut 42. The outer marginal edge portion of the plate 41 is bent downwardly, as shown, to provide a depending flange 43 adapted to be engaged by the upper ends of the small pivoted plates 25 of the holder 17, when said plates are moved to the positions shown in Figure 6, wherein the end portions 26 of the plates 25 will be engaged with the periphery of the depending flange 43.

Figure 8:
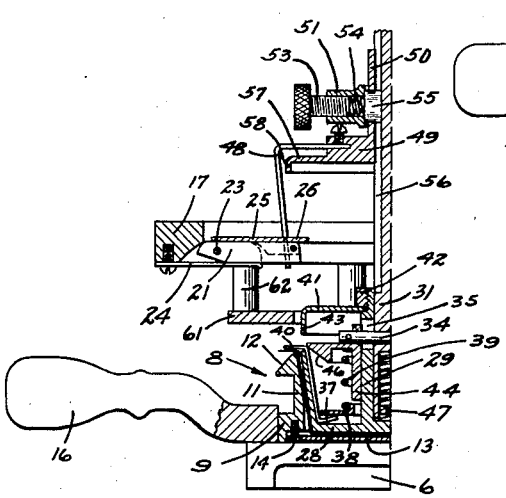
Figure 8 is a view showing the container seated in the bottom of the mold and the means for flaring the upper portion of the container wall outwardly.

The means for actuating the elements 36 of the plunger and moving them outwardly to the positions shown in Figure 8, consists of a sleeve 44 slidably mounted upon the hub 29 of the plunger 28 and provided with an outwardly projecting flange 45 having an inclined face 46 adapted to engage the upper end portions of the elements 36 and thereby move them outwardly, when the plunger is axially moved upon the rod 31 during the downward movement of the latter. The sleeve 44 is immovably secured to the rod 31 by means of the pin or bolt 34 which has its end portions received in apertures provided in the upper portion of the sleeve, as will readily be understood by reference to Figure 3. The spring 39, engaged with the plate 38 at the bottom of the plunger, has its upper end seated against the outwardly projecting flange 45 of the sleeve 44, whereby the parts are normally retained in the positions shown in Figure 3. An additional spring 47 is shown mounted in a socket provided in the lower end of the rod 31. This spring cooperates with the spring 39 to exert a downward pressure against the plunger.

Figure 5:
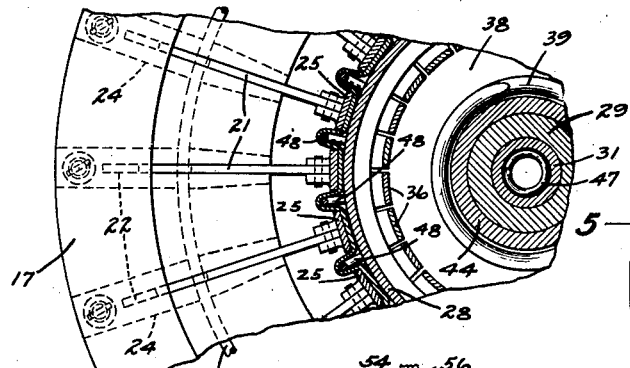
Figure 5 is a detail sectional view on the line 5—5 of Figure 4, showing the crimping means in operative position.
Figure 4:
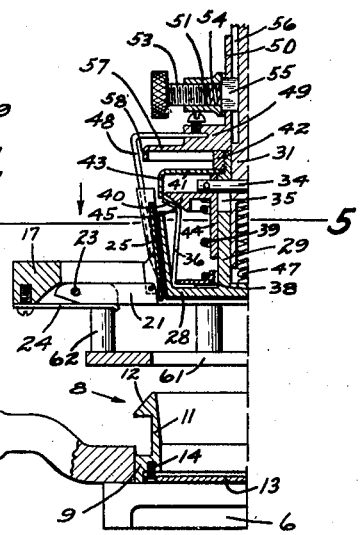
Figure 4 is a detail sectional view showing the folding mechanism actuated to initially fold a sheet of material from which a container is to be formed, and also showing the means for crimping portions of the sheet to take up the surplus material therein resulting from the folding thereof.

When folding the outer marginal portions of the blank 27 upwardly to form the side walls of the container, means must preferably be provided for crimping or producing a plurality of small folds in the upwardly turned portions of the blank to take up the surplus material resulting from the folding thereof, particularly when the containers are shaped as shown in Figure 11. Such means is shown in Figures 3, 4, and 5, and consists of a plurality of depending fingers 48 secured to a support 49 slidably mounted upon the piston rod 31. The support 49 is shown provided with a hub 50 having a boss 51 shown secured thereto by means of a sleeve 52. The hub 51 is tapped to receive an adjusting screw 53, the inner end of which is engaged with one end of a suitable spring 54. The other end of the spring is seated against a block 55 mounted for sliding movement in a key-way 56 provided in the rod 31. The block 55 prevents the support 49 from relatively rotating upon the rod 31, and the spring 54 is adapted to exert a slight pressure against the block 55, so as to cause it to frictionally retain the support 49 in position upon the rod 31. The support 49 is provided with a horizontal web 57 having an annular depending flange 58 thereon adapted to be engaged by the outer swingable end portions of the folding plates 25, when the plunger is moved downwardly, as shown in Figure 6.

To form a container of circular cross section, as shown in Figure 11, a circular sheet of material 27 is placed upon the folding plates 25 of the support 17, as shown in Figure 3. The plunger 28 is then moved downwardly into engagement with the top surface of the sheet 27, and as it continues downwardly, the folding plates 25 of the holder 17 will swing upwardly against the sides of the plunger, causing the outer marginal edge portions of the sheet to be folded inwardly against the periphery of the plunger, as shown in Figure 4. The folding plates 25 are swung upwardly because of the lower end of the plunger exerting a downward pressure upon the ends 26 thereof which are located within the pivots supporting the plates 25 upon the members 21.

The fingers 48 are positioned between the folding plates 25 and are so arranged that when the outer portions of the blank are folded upwardly, a plurality of small folds will be formed therein, as best shown in Figure 5, these folds taking up the surplus material in the blank so that the walls thereof may be accurately formed as shown in Figure 11.

Figure 6:
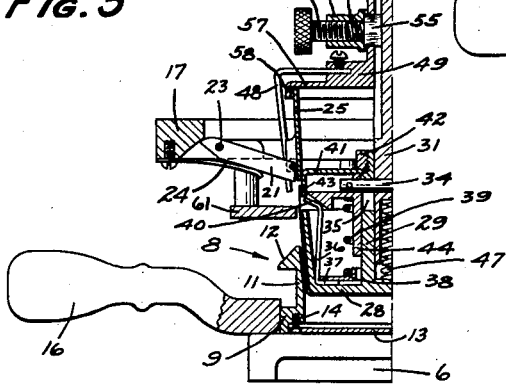
Figure 6 is a view similar to Figure 4, showing the lower portion of the partially completed container entering the mold.
Figure 7:
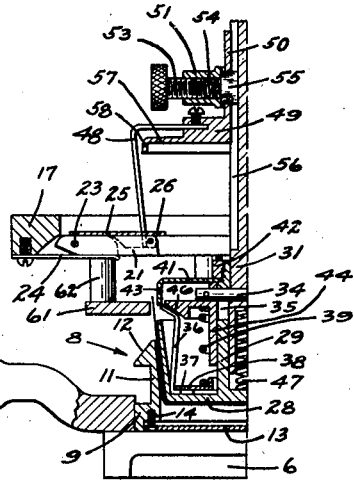
Figure 7 is a view showing the crimping means disengaged from the walls of the container to permit flaring the upper marginal edge of the container wall outwardly.

As the plunger 28 continues downwardly through the support 17, which, as hereinbefore stated, is fixed to the upright 5, the partially completed container will enter the mold, as shown in Figure 6. The inner surfaces of the walls of the mold are tapered to correspond to the taper of the periphery of the plunger 28, so that when the container is forced into the mold, the folds formed in the upright wall portions thereof will be flattened out, as shown in Figure 11. Upon the initial downward movement of the plunger, the support 49 will be carried downwardly with the rod 31 because of the frictional engagement of the block 55 with the bottom of the key-way 56. When the horizontal web 57, supporting the depending flange 58, engages the upper ends of the folding plates 25, as shown in Figure 6, the support 49 will come to rest, but the plunger will continue downwardly, thereby moving the partially completed walls of the container out of engagement with the crimping and folding fingers 48, as shown in Figure 7. As soon as the flange 43 of the plate 41 moves out of engagement with the end portions 26 of the folding plates 25, the plates 25 will be thrust upwardly by the action of the springs 24 which will return the members 21 to their normal positions, and cause the support 49 to be moved upwardly upon the rod 31, so as to cause the depending flange 58 to move out of engagement with the folding plates 25, whereupon the latter will return by gravity to their normal horizontal positions, shown in Figures 3, 7, and 8.

When the plunger reaches the limit of its downward movement, which is determined by the bottom 13 of the mold 8, the sleeve 44 will move downwardly upon the hub 29 of the plunger 28, against the tensions of the springs 39 and 47, which action will cause the inclined face 46 of the sleeve 44 to engage the folding elements 36 and thrust them outwardly, whereby the upper marginal edge portions of the container walls will be flared outwardly, as shown in Figures 8 and 11, thereby completing the formation of the container. The plunger is then returned to its normal position, shown in Figure 3, whereupon the outwardly turned flange 59 of the container walls will engage a stripper plate 61, secured to the holder 17 by means of suitable studs 62. This stripper plate will release the container from the plunger and cause the container to drop by gravity into the mold 8. It is to be understood that when the rod 31 commences its upward movement, the sleeve 44 will move upwardly therewith until the pin 34 engages the upper ends of the slots 35, whereupon, the plunger 28, sleeve 44, and rod 31 will move upwardly as a unit. Relative movement of the sleeve 44 upon the hub 29 of the plunger will cause the folding elements 36 to return to their normal contracted positions, shown in Figure 3, so that they may pass upwardly through the central opening provided in the stripper plate 61. Upon the upstroke of the plunger, the plate 41 supporting the depending flange 43, will engage the members 21 and folding plates 25 and swing them upwardly about the axes of their pivots 23, until the flange 43 has passed therethrough, after which the members 21 and folding plates 25 will drop by gravity to their normal horizontal positions, shown in Figure 3.

The means provided for actuating the plunger 28 is shown in Figures 1, 2, and 3, and consists of a rocker arm 63, having one end pivotally connected to the rod 31 and its other end having a rod 64 connecting it with a suitable foot pedal 65, pivotally mounted upon a rod 66 suitably supported upon the legs 3, upon which the table 2 is mounted (see Figure 1). A suitable spring 67 normally holds the pedal 65 in an elevated position, and also retains the plunger in the elevated position, shown in Figure 3. The rocker arm 63 is pivotally supported upon a forked arm 68, the lower end of which is supported in the bracket 18, shown in Figure 3. In the drawings, I have shown the rocker arm 63 traversing an elongated aperture 69 provided in the upright 5. The upper end of this aperture may be arranged to limit the upward movement of the rocker arm, as shown in Figure 3.

*Measuring and filling mechanism—Station B*

The mechanism for filling the containers with a predetermined quantity of material is shown in Figures 1, 2, and 12, and comprises a hopper 71 supported upon a filler tube 72 having an outwardly flared head 73 provided with a seat 74 in which the lower end of the hopper 71 is suitably secured. The filler tube is supported in split brackets 75 and 76 each provided with a thumb screw 77, whereby the tube 72 may be secured in position in said brackets. The brackets are supported upon a housing 78, suitably secured to a post 79 mounted upon a base plate 81 which, in turn, is suitably secured to the table 2.

A rotary disk valve 82, having a cut-away portion 83, is supported upon the lower end of a shaft 84 mounted in suitable bearings provided in the housing 78. This valve provides means for closing the lower end of the filler tube 72, as shown in Figure 12. The upper end of the shaft 84 extends above the top wall of the housing 78 and has a suitable compression spring 85 coiled thereabout, one end of which engages the housing 78 and the opposite end thereof engaging a washer 86 secured to the end of the shaft 84 by a suitable bolt or nut 87. This spring constantly exerts an upward pressure on the shaft 84 to hold the disk valve 82 in contact with the lower end of the filler tube 72. The shaft 84 may be driven from an upright shaft 88 by suitable gears 89. The upright shaft 88 is shown driven from a drive shaft 91 by spiral gears 92. The drive shaft 91 is mounted in suitable bearings provided in the housing 78, as partially shown in Figures 1 and 2.

The means for feeding the material downwardly through the feed tube 72 is shown in detail in Figure 12 and consists of a sleeve valve 93 mounted for limited vertical movement. The lower end of the sleeve valve 93 is supported in suitable guides 94, here shown integrally formed with the head 73 of the filler tube, and the upper end of the sleeve is supported in a guide ring 95 mounted upon studs 96 shown secured to the sleeve guides 94. A projection 97 is provided upon the periphery of the sleeve valve 93, the upper end of which is adapted to engage the guide ring 95 to limit the upward movement of the valve. The lower end of the valve 93 is beveled as shown in Figure 12 and is adapted to engage a narrow seat 98 provided in the head 73. In Figure 12, the sleeve valve 93 is shown in its normal position in engagement with the seat 98.

The means for actuating the sleeve valve 93 and feeding the material downwardly through the filler tube 72 consists of a piston 99 mounted for reciprocatory movement within the sleeve valve 93. This piston is preferably provided with piston rings 101 adapted to seal the joint between the periphery of the piston and the walls of the bore of the sleeve valve 93.

The piston 99 is adapted to be actuated by a piston rod 102 shown provided at its lower end with a suitable head 103 situated within a chamber 107 provided in the piston 99. The head 103 is adapted to engage a valve seat 105 provided in the lower portion of the piston, for the purpose of closing a port 106 adapted to establish communication between the chamber 107 and the interior of the filler tube 72. When the piston descends in the sleeve valve 93, the head 103 will engage the valve seat 105 and close the port 106. A plurality of small ports 108 connect the piston chamber 107 with the upper portion of the sleeve valve 93.

In the drawings, I have shown the piston comprising three parts, exclusive of the rings 101; an upper section 109, an intermediate section 111, and a lower section 112, connected together by suitable screw threads, as shown. The intermediate section is provided with annular recesses 113 adapted to receive the piston rings 101.

Means are provided whereby the sleeve valve 93 may readily be removed from its guides for cleaning, when necessary. Such means is shown in Figure 12 and consists of a small clip 114 having its inner end portion 115 bent downwardly and received in a notch 116, provided in the guide ring 95. The clip 114 has a slot 117 therein adapted to receive a screw 118 by means of which it may be secured to the guide ring 95. To remove the sleeve valve 93 from its guides, the screw 118 is loosened and the clip 114 moved to the dotted line position, indicated in Figure 12, whereupon the projection 97 upon the periphery of the sleeve valve 93 may pass upwardly through the notch 116 provided in the guide ring 95, and permit the sleeve to be removed from the hopper. Before removing the sleeve valve 93 from its guides, the piston rod 102 is disconnected from a rocker arm 119 supported upon the upper portion of the hopper by means of a bracket 121. By removing a pin 122 which connects the upper end of the piston rod 102 with the rocker arm 119, the piston and sleeve valve may be removed as a unit from the hopper.

The means for operating the rocker arm 119 is shown in Figure 12 and consists of a connecting rod 123 having its upper end connected to one end of the rocker arm 119 and its lower end adjustably connected to an operating arm 124 by means of a slidably mounted block 125 and an adjusting screw 126. The block 125 is movable in a slot 127, provided in the arm 124. The opposite end of the arm 124 is pivotally connected to the housing 78 by means of a pin 128. A short pitman 129 operatively connects an intermediate portion of the arm 124 with an eccentric 131 secured to the drive shaft 91.

In the operation of the novel measuring and filling mechanism herein described, the material to be packaged, which preferably is in a semi-liquid state, is delivered into the hopper 71. When the apparatus is at rest, the piston 99 and sleeve valve 93 are in the positions shown in Figure 12, whereby the material will be retained in the hopper because of the sleeve valve 93 being engaged with the seat 98 within the head 73 of the filler tube. When the container has been positioned beneath the lower end of the filler tube, as indicated in dotted lines in Figure 12, the operator will cause the drive shaft 91 to rotate, which will actuate the rocker arm 119 and lift the piston upwardly to a position within the upper end of the sleeve valve 93. The initial upward movement of the piston will cause the sleeve valve 93 to move upwardly therewith, because of the frictional engagement of the piston rings with the bore of the sleeve valve, until the shoulder 97 upon the sleeve valve engages the guide ring 95, whereupon the sleeve valve will come to rest, but the piston will continue upwardly.

Such upward movement of the piston will cause a portion of the material to be drawn into the sleeve valve 93 because of the lower beveled edge thereof being spaced from the seat 98. At the same time, a small quantity of material will pass downwardly through the ducts 108 in the upper portion of the piston, and into the piston chamber 107, from which it may pass through the duct 106 into the lower portion of the sleeve valve. Upon the downward stroke of the piston, the material drawn into the sleeve valve by the suction of the piston in its upward movement, will be forced downwardly into the filler tube, it being understood that upon the downward movement of the piston, the head 103 of the piston rod 102 is engaged with the seat 105 within the piston to prevent the material beneath the piston to pass upwardly through the duct 106, as the piston descends.

During the operation of the piston, as above described, the disk valve 82 at the bottom of the filler tube 72 will be actuated so that when the piston commences its downward movement, the cut-away portion 83 of the disk valve 82 will register with the discharge end of the filler tube to permit the material to be discharged therefrom into the container positioned therebeneath.

The ducts 108 connecting the upper portion of the sleeve valve 93 with the piston chamber 107 cooperate with the duct 106 and valve head 103 to prevent the formation of a vacuum in the upper end of the filler tube, during the upward movement of the piston. The formation of a vacuum is avoided because of the valve head 103 at the lower end of the piston rod 102 moving out of engagement with the seat 105, so that when the piston starts its upward movement, a portion of the material contained in the upper portion of the sleeve valve 93 will flow downwardly through the ducts 108, chamber 107, and through the duct 106 into the lower portion of the sleeve valve 93, thereby positively eliminating the formation of a vacuum in the filler tube, with the result that the material contained in the filler tube will be free from air bubbles or pockets. By thus permitting a portion of the material to flow downwardly through the piston during the upstroke thereof, less energy is required to lift the piston and sleeve valve.

The quantity of material discharged from the filler tube 72 for each cycle of operation may be varied by manipulation of the adjusting screw 126 which, it will be noted by reference to Figure 12, is provided with a knurled head 132, whereby it may be conveniently rotated. Adjustment of this screw will cause the block 125 to be relatively moved in the slot 127, whereby the stroke of the piston may be increased or decreased, as desired.

The means for operating the drive shaft 91 is shown in Figures 1 and 2, and consists of a clutch mechanism mounted upon the drive shaft 91 exteriorly of the housing 78, and adapted to be operatively connected with a pulley 133, loosely mounted upon the shaft 91 and adapted for continuous rotation. This clutch mechanism is shown in detail in Figures 12A and 12B, and consists of a drum 134 secured to the drive shaft 91 and having a spring-actuated bolt 135 mounted therein having a terminal 136 adapted to be received in one of a plurality of sockets 137 provided in the adjacent face of the pulley 133. An anti-friction roller 138 is mounted upon the opposite end of the bolt 135 by means of a pin 139, and is adapted to be engaged by a cam lever 141 mounted upon a suitable pivot 142, secured to the housing 78, as shown in Figure 12B.

The cam lever 141 is provided with a shoulder 143 adapted to be engaged by the roller 138, whereby the drum 134 and drive shaft 91 will come to rest in the same relative positions at the end of each cycle of operation. A collar 144 is terminally secured to the shaft 91 to retain the pulley 133 in position thereon. A connecting rod 145 has one end pivotally connected to the cam lever 141 and its opposite end similarly connected to an extension 146 provided upon a foot pedal 147, pivotally mounted upon the fixed rod 66, as best shown in Figure 1. A collar 148 is shown secured to the connecting rod 145 and is engaged with one end of a spring 149, the opposite end of which is seated against the table 2, whereby the connecting rod 145 is normally retained in the position shown in Figures 1 and 12A, in which position the cam lever 141 will be positioned in the path of the roller 138.

To start the drive shaft 91, the operator depresses the pedal 147, whereby the cam lever 141 will be moved out of engagement with the anti-friction roller 138, permitting the terminal 136 of the bolt 135 to move into engagement with one of the sockets 137 provided in the hub of the idler pulley 133. As soon as the operator releases the foot pedal 147, the cam lever 141 will return to its normal operative position in the path of the roller 138, so that when the latter approaches its starting position, it will engage the cam lever, whereby the bolt 135 will be axially moved to withdraw the terminal 136 from the socket 137 in the idler pulley 133, whereupon the drum 134 will come to rest.

The idler pulley 133 has a belt 151 connecting it with a drive pulley 152 secured to a drive shaft 153 mounted in suitable bearings provided beneath the table 2. This shaft is operatively driven by a motor 154 having a belt 155 operatively connecting it therewith by means of a suitable gear mechanism 156, indicated in Figure 1.

*Closing and sealing mechanism—Station C*

Figure 16:
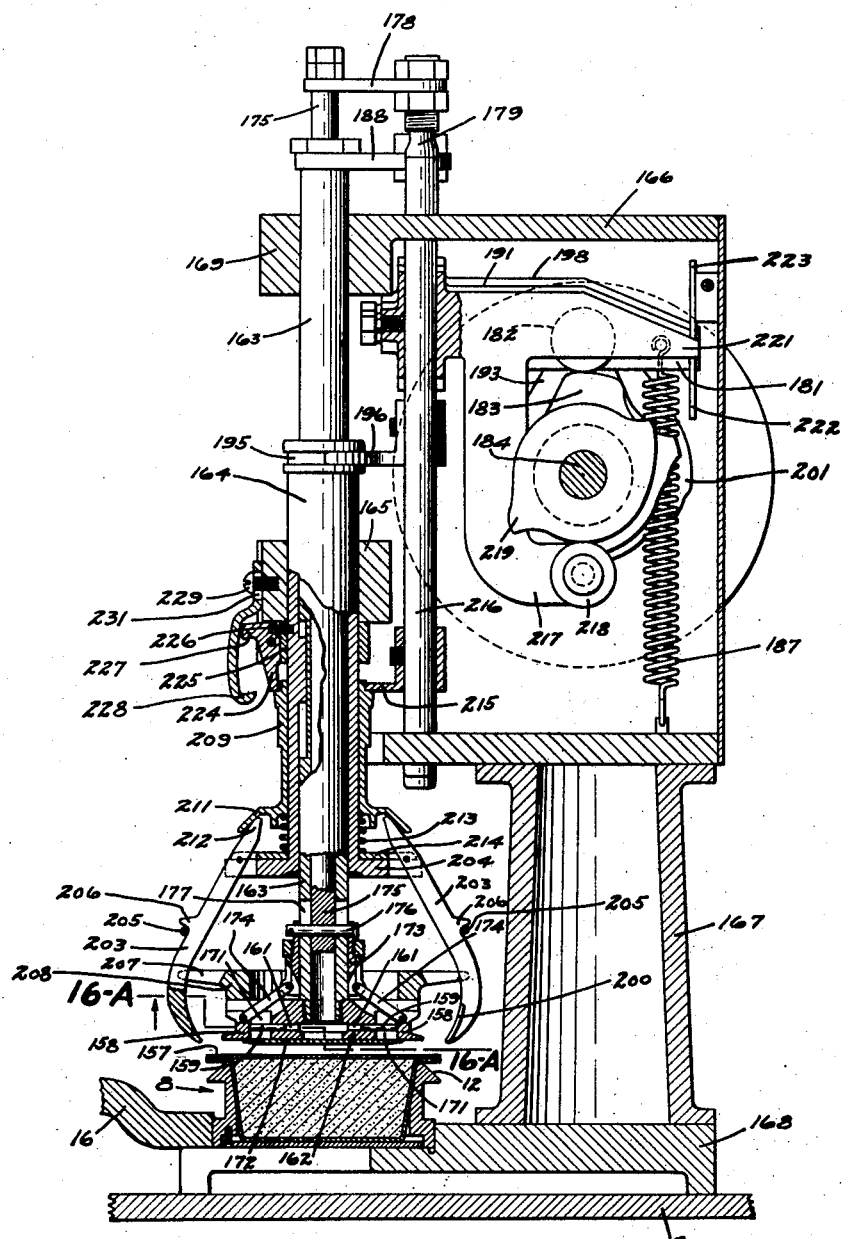
Figure 16 is a sectional view on the lines 16—16 of Figures 2 and 15, showing the container closing and sealing mechanism in normal inoperative position.
Figure 18:
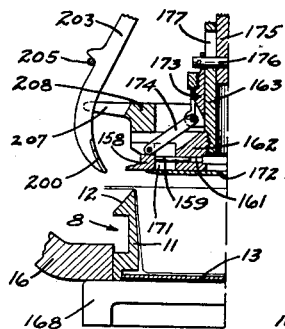
Figure 18 is a detail sectional view showing a portion of the container closing and sealing mechanism, the parts being shown in normal positions.

The means for closing and sealing the containers when filled, is best shown in Figures 15 and 16, and 18 to 30, inclusive. The container, after having been filled at Station B, is delivered to Station C, while still supported in the mold 8, as shown in Figure 16. A suitable closure 157, shaped to conform substantially to the mouth of the container, is positioned upon the container, as shown in Figure 16, after which the closing and sealing mechanism may be operated.

The closing and sealing mechanism comprises a plurality of folding elements 158, having pins 159 slidably mounted in guides 161 provided in a head 162 suitably secured to the lower end of a tubular member 163. The lower portion of the tubular member 163 is slidably supported within a sleeve 164, mounted for reciprocal movement within a guide bearing 165, provided upon a housing 166. This housing is shown supported upon a suitable standard 167 secured to a base plate 168, mounted upon the table 2. The upper end of the tubular member 163 is supported in a guide 169. The forming elements 158 are guidingly supported in recesses 171 provided in the head 162, as shown in Figures 16 and 16A. A plate 172 is secured to the bottom face of the head 162, and the marginal edge portion of this plate forms the lower walls of the recesses 171 wherein the forming elements 158 are mounted.

The means for actuating the forming elements 158 comprises a collar 173 slidably mounted upon the lower portion of the tubular member 163 and having a plurality of links 174 connected therewith. The lower end of each link is pivotally connected with a forming element 158 so that when the collar 173 is relatively moved upon the tubular member 163, the forming elements 158 will be moved radially with respect to the axis of the member 163. A rod 175 is mounted for sliding movement within the tubular member 163, and the lower end of this rod supports a pin 176, the terminals of which are received in suitable apertures provided in the collar 173. Elongated openings 177 are provided in the wall of the member 163 to permit movement of the pin 176, with respect thereto.

Figure 17:
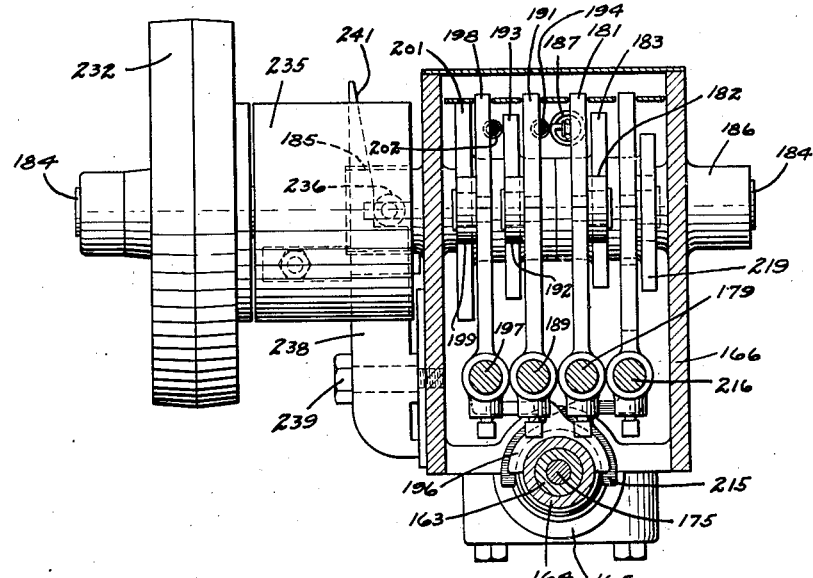
Figure 17 is a plan view of Figure 14, partially broken away to show the relative positions of the cams for operating the various parts of the closing and sealing mechanism.

The upper end of the rod 175 has one end of a bar 178 secured thereto, the opposite end of which is secured to an operating rod 179 slidably mounted in suitable guides provided in the upper and lower walls of the housing 166. The operating rod 179 has an outwardly extending arm 181 provided with an anti-friction roller 182 adapted to ride upon a cam 183, secured to an operating shaft 184 mounted in suitable bearings 185 and 186 provided in the side walls of the housing 166, as shown in Figures 15 and 17. A suitable spring 187 has one end connected with the lower portion of the housing 166, and its upper end with the arm 181 so as to constantly urge the arm downwardly to hold the roller 182 in engagement with the periphery of the cam 183.

The tubular member 163 has one end of a bar 188 secured to the upper end thereof, the opposite end of which is secured to an operating rod 189, mounted in suitable guides provided in the upper and lower walls of the housing 166, and having an outwardly extending arm 191 secured thereto provided with an anti-friction roller 192, adapted to ride upon the periphery of a cam 193 secured to the operating shaft 184. The arm 191 has a relatively smaller spring 194 connected therewith which functions to hold the roller 192 in engagement with the periphery of the cam 193.

The sleeve 164 is shown provided at its upper end with an annular groove 195 adapted to receive a fork 196 supported upon an operating rod 197 disposed adjacent to the rod 189, as shown in Figure 17. The rod 197 has an arm 198 secured thereto which carries an anti-friction roller 199 adapted to ride upon the periphery of a cam 201, also mounted upon the operating shaft 184. This arm, like the arm 191 of the operating rod 189, is provided with a spring 202 which functions to hold the roller 199 in peripheral engagement with the cam 201.

Figure 20:
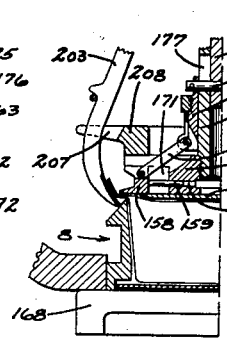
Figure 20 is a view showing the initial folding of the marginal edge portions of the container and closure.

A plurality of fingers 203 are pivotally supported upon a head 204 provided upon the lower end of the sleeve 164, as best shown in Figure 16. The lower ends of these fingers are preferably curved inwardly, and each is provided with a small blade or plate 200 adapted to engage the outwardly extending marginal edge portions of the container and closure, as shown in Figure 20. A suitable tension element 205 encircles the folding fingers 203 and constantly tends to contract them, or move them inwardly to the positions shown in Figures 21 and 27. Each finger is provided with a detent 206 which cooperate to provide means for retaining the tension element 205 in position upon the fingers 203. The lower ends of the fingers 203 are guidingly supported in suitable slots 207 provided in an outwardly extending flange 208 provided upon the upper portion of the head 162, situated at the lower end of the tubular member 163. The slots 207 permit free radial movement of the fingers 203.

The means for actuating the folding fingers 203 is best shown in Figure 16, and consists of an actuator 209 supported upon the sleeve 164 and adapted for sliding movement thereon. This actuator is provided at its lower portion with a downwardly extending inclined flange 211 adapted to engage the upwardly projecting end portions 212 of the folding fingers 203, as shown, so as to retain the lower ends of the fingers in their proper positions. A suitable compression spring 213 has one end seated againt a plate 214 secured to the upper side of the head 204, and has its opposite end engaged with the lower end of the actuator 209 so as to constantly urge the latter in an upward direction.

A yoke 215 is engaged with the upper end of the actuator 209 and is secured to an operating rod 216, guidingly supported in the upper and lower walls of the housing 166, as will readily be understood by reference to Figure 16. A depending arm 217 is secured to the rod 216 and has a roller 218 adapted to ride upon a cam 219 secured to the operating shaft 184. The spring 213 constantly exerts an upward thrust upon the actuator 209 and operating rod 216 to hold the roller 218 in peripheral engagement with the cam 219. The arm 217 is provided with an outwardly extending portion 221, the outer end of which is mounted for movement in a guide slot 222 provided in a plate 223 preferably pivotally mounted in the side walls of the housing 166. The terminals of the arms 181, 191, and 198 are guidingly supported in similar slots provided in the plate 223 as will be noted by reference to Figure 17.

Means are provided for locking the actuator 209 to the sleeve 164, so that at the beginning of each cycle of operation, the sleeve 164 and fingers 203 will move downwardly simultaneously until the plate 172 at the bottom of the head 162 engages the closure 157 positioned on top of the container.

Such means is shown in Figure 16 and comprises a dog 224 pivotally mounted upon a collar 225 secured to the sleeve 164. The dog 224 has a spring 226 which constantly tends to move the lower end of the dog inwardly into engagement with the annular shoulder provided at the upper end of the actuator 209. A projection 227 is provided upon the dog 224 adapted to engage a hook 228 which is adjustably secured to the bearing 165 by means of a screw 229. This screw is received in a slot 231 provided in the hook 228, whereby the latter may be vertically adjusted upon the bearing 165 to properly time the parts.

Figure 19:
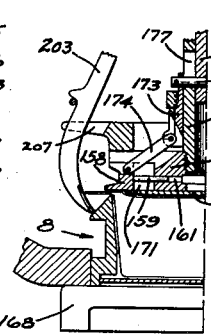
Figure 19 is a similar view showing the positions of the parts just before the outwardly flared end portion of the container and the marginal edge portion of the closure are initially folded inwardly.

When the plate 172 engages the closure 157, the head 162 and associated parts will come to rest, as shown in Figure 19, while the fingers 203 will continue downwardly to the positions shown in Figure 19, because of the cam 201 permitting the operating rod 197 to be moved downwardly by the action of the spring 202. Such downward movement of the head 204 will cause the upper ends 212 of the fingers 203 to move downwardly upon the inclined surface of the flange 211, whereupon the flexible element 205 encircling the fingers will cause them to move inwardly so that the lower terminals will engage the inclined upper surface 12 of the wall of the mold 8, as shown in Figure 19. When the head 162 is positioned as shown in Figure 19, the folding elements 158 will be moved outwardly to their expanded positions, as shown in Figures 18 to 21, inclusive.

When the fingers 203 reach the positions shown in Figure 19, the projection 227 provided upon the dog 224 will engage the hook 228, whereupon the dog 224 will be moved out of engagement with the annular shoulder provided at the upper end of the actuator 209, whereby the spring 213 will immediately return the actuator to an elevated position, permitting the lower ends of the fingers to be moved inwardly by the element 205 into engagement with the outwardly flared marginal edge portion 59 of the container, as shown in Figure 20. As the fingers move upwardly, the lower ends thereof will fold the outer marginal edge portions of the container and closure walls inwardly over the folding elements 158, as shown in Figure 21, after which the upper ends 212 of the fingers will engage the inclined flange 211, which will cause the lower ends of the fingers to be swung outwardly to the positions shown in Figure 22.

Figure 21:
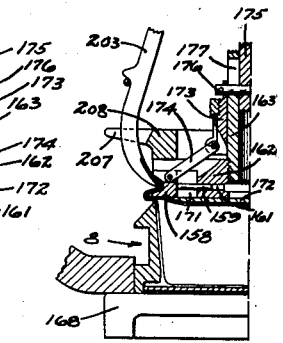
Figure 21 is a view showing the next step in the container closing operation.

When the parts are positioned as shown in Figure 21, the actuator 209 will be in its normal uppermost position, shown in Figure 16, and will be limited from further upward movement by the roller 218 engaging the bottom of the cam 219, as shown. The spring 213 holds the actuator in its normal elevated position.

Figure 22:
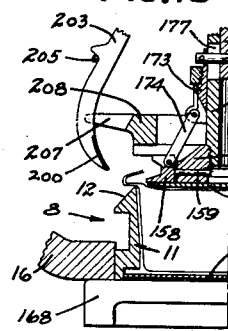
Figure 22 is a view showing the folding fingers disengaged from the partially folded wall portions of the container, and forming elements contracted.
Figure 23:
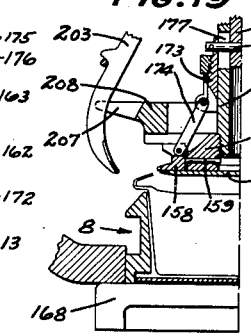
Figure 23 is a view similar to Figure 22, showing the movable parts of the closing mechanism completely disengaged from the partially folded wall portions of the container.

In the next step of the cycle of operation, the sleeve 164 is moved upwardly by its cam 201, causing the upper ends 212 of the fingers 203 to engage the inclined depending flange 211, whereupon the lower ends of the fingers will be moved outwardly to the positions shown in Figure 22. When the sleeve 164 reaches the limit of its upward movement, the dog 224 will move into engagement with the annular shoulder provided at the upper end of the actuator 209, as shown in Figure 16. Simultaneously, as the sleeve 164 is moved upwardly, the rod 175 will be moved upwardly, causing the collar 173, operatively connected with the lower end thereof, to be relatively moved upon the tubular member 163, thereby causing the folding elements 158 to be contracted or moved inwardly to the positions shown in Figures 22 and 23. Subsequent to the contraction of the folding elements 158, the tubular member 163 is moved upwardly, together with the rod 175, whereby the plate 172 and folding elements 158 are moved out of engagement with the partially folded closure, as shown in Figure 23.

Figure 37:
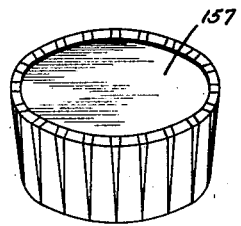
Figure 37 is a perspective view showing a completed container filled, closed, and sealed.
Figure 24:
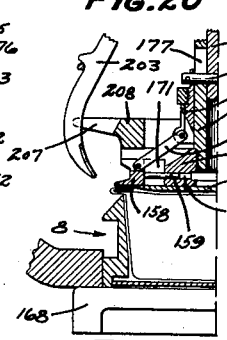
Figure 24 is a view showing the forming elements expanded and actuated to complete the formation of the first fold, shown in Figure 34.
Figure 25:
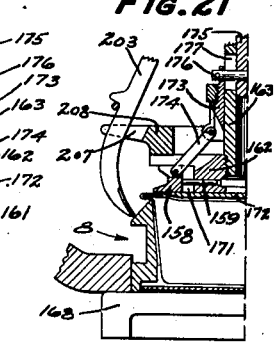
Figure 25 is a view showing the forming elements partially contracted and the folding fingers positioned to form the second fold.
Figure 26:
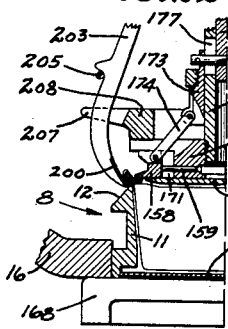
Figure 26 is a view similar to Figure 25, showing the fingers engaged with the container walls in the operation of forming the second fold.
Figure 27:
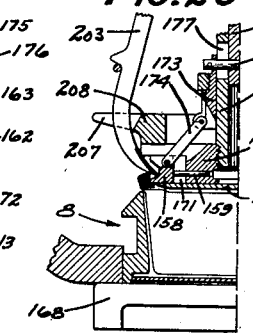
Figure 27 is a view showing the next step in the formation of the second fold.
Figure 28:
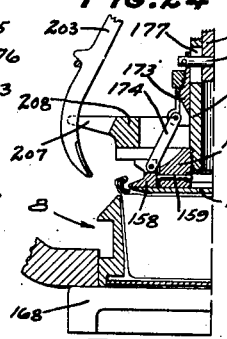
Figure 28 is a view showing the folding fingers expanded and the forming elements contracted to permit elevating said parts.
Figure 29:
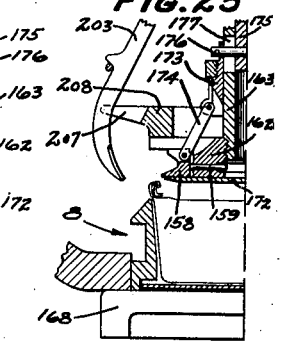
Figure 29 is a view similar to Figure 28, showing the folding fingers and forming elements moved upwardly to an elevation above the folded edge portions of the container and closure.
Figure 30:
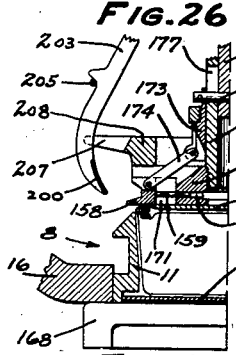
Figure 30 is a view showing the forming elements expanded and moved downwardly to complete the closing and sealing operation.
Figure 32:
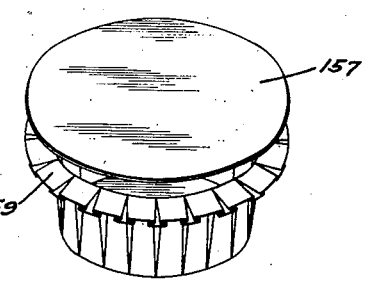
Figure 32 is a perspective view showing a container with a closure positioned thereabove.
Figure 36:
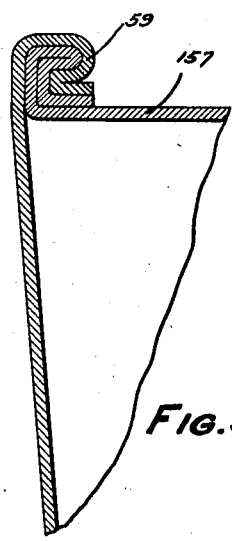
Figure 36 is a view showing the edge portions of the container and closure completely folded and sealed.

In the next step, the folding elements 158 are expanded and the head 162 lowered into engagement with the closure, as shown in Figure 24, whereupon the expanded folding elements 158 will engage and compress the inwardly folded marginal edge portions of the container and closure. The fingers 203 will then be moved downwardly to the positions shown in Figure 25 and at substantially the same time, the folding elements 158 will be contracted so that when the fingers are again moved upwardly, the partially folded edge portions of the container and closure will again be folded inwardly, as shown in Figure 26, to the position shown in Figure 27. The fingers 203 are then expanded and moved upwardly and the folding elements contracted to move them out of engagement with the partially folded edge portions of the container and closure, after which the head 162 is moved upwardly to the position shown in Figure 29. The folding elements are then expanded and the head 162 moved downwardly, whereupon the inwardly folded edge portions of the container and closure walls will be pressed firmly downwardly against the closure, thereby hermetically sealing the container, as shown in Figure 37. The parts are then returned to their normal inoperative positions, shown in Figures 15 and 16. When the container has been sealed as above described, the marginal edge portions of the closure and container will be folded inwardly over the container as shown in Figure 36, thereby positively sealing the joint between the closure and container.

The driving means for the operating shaft 184 of the container closing and sealing mechanism is similar in construction to the driving means for the operating shaft 91, and is shown in detail in Figure 15. This mechanism comprises an idler pulley 232 mounted upon the operating shaft 184 and provided with a plurality of sockets 233 adapted to be engaged by a spring-actuated bolt 234, slidably mounted in a drum 235 suitably secured to the shaft 184. The bolt 235 has an anti-friction roller 236 mounted thereon by means of a pin 237, and a cam lever 238 is pivotally mounted upon the housing 166 by a suitable pivot 239. The cam lever 238 has a cam face 241 adapted to be engaged by the roller 236, whereby the bolt 234 is moved inwardly to the position shown in Figure 15, out of engagement with the idler pulley 232.

A means for operating the cam lever 238 is shown in Figure 1, and may consist of a rod 242 having its upper end pivotally connected with the lever 238 and its lower end operatively connected with a foot pedal 243 by means of an extension 244. A suitable compression spring 245 is shown coiled about the rod 242 and has one end engaged with the table 2 and its opposite end with a collar 246 suitably secured to the rod 242, whereby the spring constantly urges the rod upwardly to move the cam lever 238 into the path of the roller 236, as shown in Figure 15. A belt 247 operatively connects the pulley 232 with a drive pulley 248 suitably secured to the drive shaft 153.

In the operation of this novel apparatus, each container after having been completely formed at Station A, as hereinbefore described, is supported in a mold 8 during the filling, and closing, and sealing operations. When the container has been sealed, it is removed from the mold as shown in Figure 37, and may be delivered onto the table 4 where it may be placed in a suitable carton or package to prepare it for shipment. The empty mold may then be returned to Station A by means of an endless belt 251 mounted upon the pulleys 252 and 253, suitably supported upon the table, as shown in Figure 1. The belt 251 passes through suitable openings 254 and 255, provided in the table so that the upper run of the belt may travel on top of the table, as best shown in Figure 2. The empty molds are placed upon the conveyer belt 251, whereupon they will be returned to Station A for further use. A suitable deflector 256 is provided at the left hand side of the machine, as shown in Figure 2, to divert the molds towards the operator whereby he may conveniently reach them.

The conveyer belt 251 may be driven by a suitable gear drive 257 connecting the pulley 253 with the drive shaft 153, as shown in Figure 1. A suitable belt tightener 258, of ordinary construction, may be provided for taking up slack in the conveyer belt 251.

In the drawings, I have shown the various stations adapted for independent operation, each station being provided with a foot pedal, whereby they may be operated independently of each other. It is to be understood, however, that the three stations may be connected together for automatic operation without departing from the scope of the invention.

Figure 33:
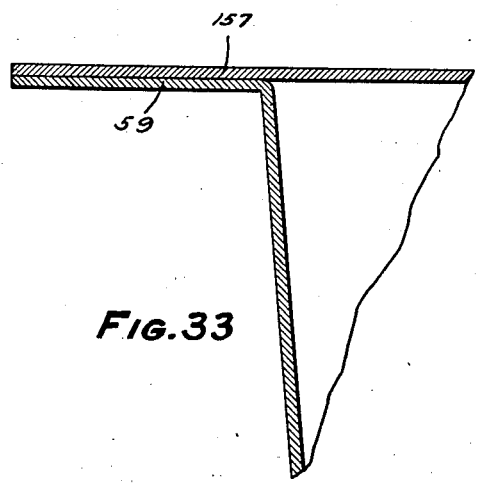
Figure 33 is an enlarged detail sectional view showing a portion of a container and its closure before the marginal edge portions thereof are folded and sealed.

Figures 33 to 36, inclusive, illustrate on an enlarged scale, the various steps involved in the closing and sealing operation. In Figure 33, a closure is shown positioned upon a container in the manner shown in Figures 16 and 18, before the marginal edge portions thereof are folded inwardly.

Figure 34:
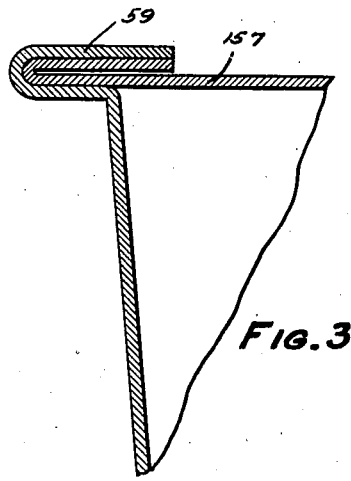
Figure 34 is a similar view showing the marginal edge portions of the container and closure partially folded as shown in Figure 24.
Figure 35:
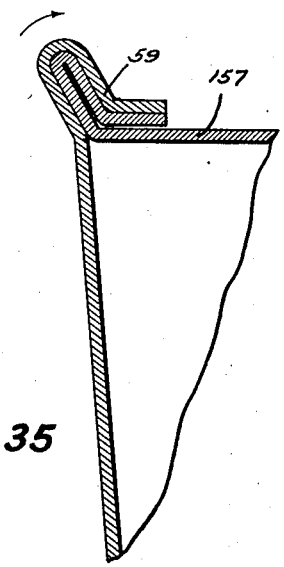
Figure 35 is a view showing the next operation in folding the container walls corresponding to that shown in Figure 26.

Figure 34 shows the first step of closing the container edge and closure; Figure 35 the next step; and Figure 36 shows the edges completely folded and compressed to form an air tight seal. By thus folding the marginal edge portions of the container and closure, the container is hermetically sealed so that food articles contained therein may be preserved for a long period of time The apparatus herein described, has been found particularly useful for forming containers from a thin water-proof material such, for example, as tin or lead foil, adapted to be inserted in a supporting carton of a relatively stiffer material, which will stand handling and rough usage, such as the articles may be subjected to when in transit. In some instances, it may be desired to form the containers of a relatively heavier and more substantial material, whereby the use of an enclosing carton may be dispensed with. The invention has been found very useful in the manufacture of containers for such perishable products as cheese. The operation of the closing and sealing mechanism is such that any air confined within the container directly beneath the closure will be forced out of the container when the plate 172 of the head 162 engages the closure and forces it downwardly against the material, as shown in Figure 19. Following this operation, the marginal edge portions of the container and closure are folded so that the container, when completely filled and sealed, as shown in Figure 37, will be substantially free from entrapped air, thereby permitting the product to be shipped for long distances without the need of refrigeration.

I claim as my invention:

1. The method of closing and sealing a container provided at its open end with an outwardly projecting flange surrounding the mouth of the container and upon which a closure is superimposed, which consists in first inwardly folding the edge portions of said flange and said closure to provide a single fold, then folding all of said folded edge portions upon themselves to provide a double fold and whereby the edges of the container flange and the closure are exposed, and then applying pressure to said folded edge portions to hermetically seal the container.

2. In a machine for securing a closure to a filled container, a plurality of radially movable folding elements adapted to be moved into engagement with the container closure and press it firmly into engagement with the upper wall portions of the container, and means adapted to cooperate with said folding elements to fold the marginal edge portions of the container and closure walls inwardly over the body of the container to secure the closure thereto in leak-proof relation.

3. In a machine for securing a closure to a filled container, a plurality of folding elements adapted to firmly press the closure into engagement with the upper marginal edge portions of the container walls, and a plurality of radially movable pivoted fingers adapted to engage the projecting marginal edge portion of the container wall and fold it and the marginal edge of the closure inwardly over said folding elements, means for retracting said elements and means for causing pressure to be applied to said folded wall portions, whereby the closure will be secured to said container in hermetically sealed relation.

4. In a machine for securing a closure to a filled container having an outwardly turned upper edge portion upon which the closure is seated, a head adapted to be moved into engagement with said closure and press it firmly into engagement with said outwardly turned edge portion, a plurality of spring-actuated, radially movable fingers adapted to engage the marginal edge portion of said container and fold it inwardly together with the marginal edge portion of the closure, and means for applying pressure to said inwardly folded edge portions to hermetically seal the container.

5. In a machine for securing a closure to a filled container having an outwardly turned upper edge portion upon which the closure is seated, a head adapted to be moved into engagement with said closure and press it against the material in the container, whereby air entrapped in the container between the material and closure is expelled therefrom, means on the head adapted to be moved outwardly to engage and press the marginal edge portion of the closure into engagement with the outwardly turned edge portion of the container, a plurality of radially movable fingers adapted to engage and fold the marginal edge portions of the container and closure inwardly and provide a series of folds therein, and means for exerting pressure against said inwardly folded edge portions to render the joint therebetween leak-proof.

6. In an apparatus of the class described, means for supporting a container having its upper marginal edge portion turned outwardly to provide a seat for a closure, a head adapted to be moved into engagement with a closure positioned on said seat, a plurality of folding elements movably mounted in said head, means causing said elements to be moved outwardly when the head is moved into engagement with the closure whereby said elements will engage the marginal edge portion of the closure and press it firmly into engagement with the outwardly turned edge portion of the container, a plurality of radially movable fingers adapted to cooperate with said folding elements to inwardly roll the marginal edge portions of the container and closure, and means whereby pressure may be applied to said inwardly rolled edge portions to hermetically seal the container.

7. In an apparatus of the class described, means for supporting a container having its upper marginal edge portion turned outwardly to provide a seat for a closure, a head adapted to be moved into engagement with a closure positioned on said seat, a plurality of folding elements mounted in said head and adapted for radial movement, means for actuating said elements when the head is moved into engagement with the closure whereby said folding elements will engage the marginal edge portion of the closure and press it into engagement with the outwardly turned edge portion of said container, a plurality of radially movable fingers adapted to engage and fold the edge portions of the container and closure inwardly over said folding elements, and means for retracting said folding elements to permit the head to be moved out of engagement with the closure whereby, when said elements are again expanded and the head moved into engagement with the closure, said elements will engage and compress the partially folded wall portions of the container and closure.

8. In an apparatus of the class described, means for supporting a filled container having its upper marginal edge portion turned outwardly to provide an annular seat, a head mounted for vertical movement over the container and comprising a plurality of radially movable folding elements, a tubular member for supporting said head, means within said tubular member adapted to actuate said folding elements and cause them to be contracted when the head is moved upwardly, and to expand when the head is moved downwardly, and a plurality of pivoted folding fingers encircling said head and adapted to cooperate with said elements to inwardly fold the marginal edge portions of the container and closure, said folding elements also being adapted to exert pressure against said partially folded wall portions.

9. In an apparatus of the class described, means for supporting a filled container having its upper edge turned outwardly to provide a seat for a closure, a head mounted for vertical movement over said closure and having a plate adapted to engage the closure and press it firmly against the material in said container whereby the air confined between the top of the material and the closure will be expelled from the container, a plurality of folding elements movably mounted in said head, means for moving said elements outwardly whereby they may engage and press the outer marginal edge portion of the closure into engagement with the outwardly turned edge portion of the container, a plurality of folding fingers adapted to engage the bottom face of the outwardly turned edge portion of the closure and fold it and the marginal edge portion of said closure inwardly over said folding elements to provide folds therein, means for applying pressure to said partially folded edge portions and press them firmly together, means for causing said folding elements and fingers to further fold said marginal edge portions, and means for applying pressure to the completely folded edge portions to hermetically seal the container.

10. In an apparatus of the class described, means for supporting a filled container with a closure positioned thereon, a head movably mounted over said closure and having a plurality of folding elements adapted for radial movement, means for moving said head into engagement with said closure, means causing said folding elements to be moved outwardly when the head is moved downwardly, whereby said elements will engage and press the outer marginal edge portion of the closure firmly into engagement with the upper marginal edge portion of the container, a plurality of folding fingers encircling said folding elements and having their lower terminals adapted to be moved downwardly beneath the marginal edge portions of the container and closure whereby, when said fingers are moved upwardly, they will engage and inwardly fold said marginal edge portions to secure the closure to the container, means for moving said head upwardly and simultaneously causing the folding elements to be moved inwardly out of engagement with said partially folded edge portions, means for expanding said folding elements and causing them to move downwardly into engagement with said partially folded edge portions to compress them, means for causing said folding elements to be contracted, whereby said folding fingers may engage and further inwardly fold the marginal edge portions of the container and closure to provide a double fold therein, and means for applying pressure to said folded edge portions to hermetically seal the container.

11. In an apparatus for securing a disk-like cover of flexible material to a container having an outwardly turned flange surrounding its open end or mouth and adapted to receive said cover, said flange and cover being of substantially the same diameter, comprising means for first folding the marginal edge portions of said flange and cover inwardly over the cover and applying pressure thereto to press them into flatwise relation, and subsequently inwardly folding said partially folded edge portions upon themselves to provide a double fold, and applying pressure thereto to hermetically seal the container, and whereby the edges of said closure flange and said cover are exposed.

12. In a machine for securing a closure to a filled container, a plurality of movable elements adapted to engage the closure and press it into engagement with an upper wall portion of the container, and radially movable means cooperating with said elements to fold the marginal edge portions of the container walls and said closure inwardly over the container body to secure the closure to the container in leak-proof relation.

13. In a machine for securing a closure to a filled container having an outwardly turned horizontal flange adapted to receive the closure, movable means adapted to engage the closure and press it into engagement with said flange, and radially movable means cooperating with said first mentioned means to fold the marginal edge portions of the container walls and said closure inwardly over the container body to provide a plurality of folds, whereby the closure is secured to the container in leak-proof relation.

14. In a machine for securing a closure to a filled container having an outwardly turned horizontal flange adapted to receive the closure, a plurality of movable elements adapted to engage the closure and press it into engagement with said flange, and radially movable means cooperating with said elements to fold the marginal edge portions of the container walls and said closure inwardly over the container body to secure the closure to the container in leak-proof relation.

LAMBERT E. SPEAR.